United States Patent [19]
Dorenbosch et al.

[11] Patent Number: 5,801,639
[45] Date of Patent: *Sep. 1, 1998

[54] METHOD FOR OPTIMIZING TRANSMISSION OF MESSAGES IN A COMMUNICATION SYSTEM

[75] Inventors: Jheroen Pieter Dorenbosch, Waxahachie; Samir Sawaya, Grapevine, both of Tex.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 673,528

[22] Filed: Jul. 3, 1996

[51] Int. Cl.$^6$ .................................................. H04Q 1/00
[52] U.S. Cl. ........................ 340/825.44; 455/67.3; 455/67.4; 455/423
[58] Field of Search ...................... 340/825.44; 455/447, 455/67.3, 423, 67.4

[56] References Cited

U.S. PATENT DOCUMENTS

| | | |
|---|---|---|
| 4,481,670 | 11/1984 | Freeburg .................................. 455/447 |
| 4,928,096 | 5/1990 | Leonardo et al. . |
| 5,038,399 | 8/1991 | Bruckert .................................. 455/447 |
| 5,257,398 | 10/1993 | Schaeffer .................................. 455/447 |
| 5,603,088 | 2/1997 | Gorday .................................. 455/67.3 |
| 5,623,484 | 4/1997 | Muszynski .................................. 455/423 |
| 5,758,271 | 5/1998 | Rich .................................. 455/67.3 |

*Primary Examiner*—Brian Zimmerman
*Attorney, Agent, or Firm*—Eduardo Guntin

[57] ABSTRACT

A method and apparatus in a radio communication system that employs frequency reuse is used for optimizing transmission of messages to a selective call transceiver (116). The radio communication system transmits a first message (202) to the selective call transceiver (116) instructing it to listen to a second message destined for another selective call transceiver (116), to measure a signal quality level of the second message, and to transmit a response signal representative of measured signal quality. After transmitting the second message (204) to the other selective call transceiver (116), the radio communication system receives the response signal (206) from the selective call transceiver (116). In response, the radio communication system transmits a third message (212) to the selective call transceiver (116) utilizing a frequency reuse plan in accordance with the signal quality level.

24 Claims, 4 Drawing Sheets

METHOD FOR OPTIMIZING TRANSMISSION OF MESSAGES IN A COMMUNICATION SYSTEM

FIELD OF THE INVENTION

This invention relates in general to two-way radio messaging systems, and in particular to a two-way radio messaging system employing frequency reuse.

BACKGROUND OF THE INVENTION

Currently, two-way radio messaging systems (hereinafter referred to as messaging system) use frequency reuse methods for maximizing message capacity of the system with selective call transceivers. Frequency reuse is accomplished by assigning a frequency pattern to a cluster of communication cells, and repeating the frequency pattern across other clusters. When the number of communication cells in a cluster is decreased, frequency reuse is increased, thereby increasing system capacity. The increase in system capacity, however, is counterbalanced by an increase in noise interference in the messaging system. In contrast, as the number of communication cells in a cluster is increased, frequency reuse and system capacity decrease, as well as the noise interference.

Noise interferences include, for example, co-channel and adjacent channel interference. Co-channel interference occurs when communication cells of multiple clusters reuse the same communication frequency. Adjacent channel interference occurs when harmonic noise is coupled between adjacent frequency channels.

Presently, selective call transceivers that experience severe noise interference, such as described above, cannot receive messages from the messaging system until the interference subsides, or the users of the selective call transceivers move to another location where the interference is less substantial. In other instances, the interference may be less substantial, but may still require retransmission of message portions. Either situation can result in message latencies that are inconsistent with customer expectations.

Thus, what is needed is a method and apparatus that can determine the level of noise interference experienced by a selective call transceiver prior to transmitting a message thereto. In particular, the messaging system should determine the noise interference at the location of the selective call transceiver, and use this information accordingly to transmit the message to the selective call transceiver at a quality level that is sufficient for the selective call transceiver to reliably receive the message.

DESCRIPTION OF THE PREFERRED EMBODIMENT

In accordance with the present invention, a radio communication system, employing a frequency reuse method, is used for communicating messages to a plurality of selective call transceivers (SCTs) in a manner that minimizes requests for retransmission of messages transmitted to the SCTs. To reduce the likelihood of a retransmission request, the radio communication system determines the level of noise interference surrounding a targeted SCT prior to transmitting a message.

This information is determined by ascertaining the location of the targeted SCT, and by transmitting a message request to the targeted SCT instructing it to listen to a message destined for another SCT. The target SCT is further instructed to measure the signal quality of the intercepted message, and to transmit a response signal representative of the measurement. The radio communication system selects the message it has requested the targeted SCT to intercept, because the transmission means chosen for that message is expected to be similar to the transmission means chosen for the targeted SCT.

Once the radio communication system receives the response signal from the targeted SCT, it uses the measured signal quality included therein to determine an optimal method for transmitting a caller's message destined for the targeted SCT.

Figure 1:
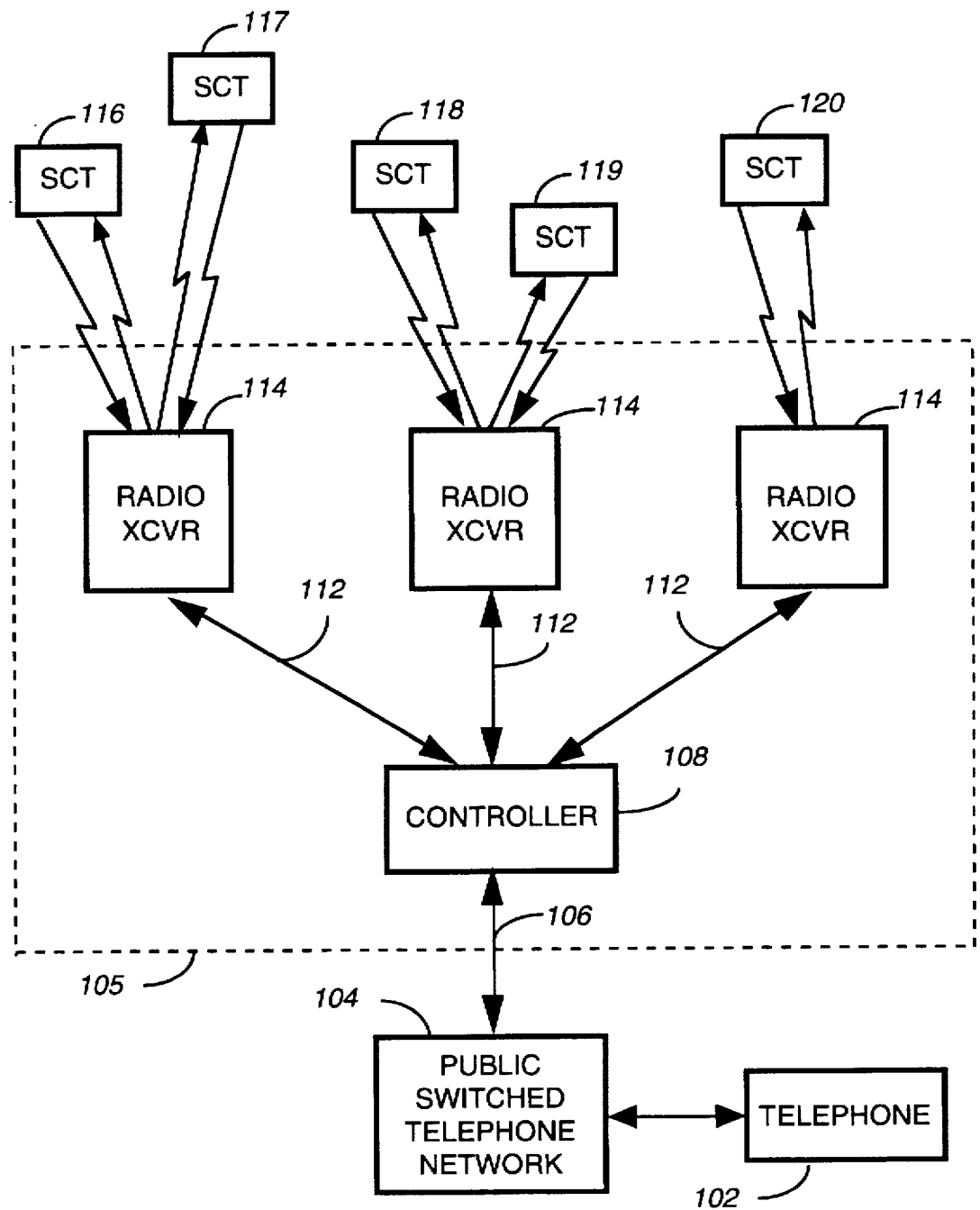
FIG. 1 is an electrical block diagram of a radio communication system.

FIG. 1 is an electrical block diagram of a radio communication system (hereinafter referred to as messaging system) that implements the method described above. The messaging system comprises a fixed portion 105 that includes a plurality of radio transceivers 114, and a controller 108. The radio transceivers 114 are used for communicating messages to a plurality of selective call transceivers (shown as SCTs 116–120 by way of example) using conventional FM transmission means. It will be appreciated that, alternatively, AM transmission means alone or in combination with FM transmission means can be used. Message exchanges between the radio transceivers 114 and the SCTs 116–120 preferably conform to the Flex family of protocols (Flex is a trademark of Motorola, Inc.). Preferably, the messaging system uses the ReFLEX digital selective call signaling protocol (ReFlex is a trademark of Motorola, Inc.) that is presently in use by various system operators in the United States. It will be appreciated that other communication protocols that are suitable to this invention can be used. However, in the discussion below it is assumed that the ReFlex protocol is used.

The controller 108 is coupled to a public switched telephone network (PSTN) 104 by way of one or more conventional telephone links 106 for receiving messages from callers using conventional telephone units 102. The controller 108 coordinates messages it receives from the PSTN 104, and sends such messages to the radio transceivers 114 by way of conventional communication links 112. The controller 108 configures the radio transceivers 114 prior to transmitting the messages according to interference measurement information it receives from targeted SCTs destined to receive the messages.

Figure 2:
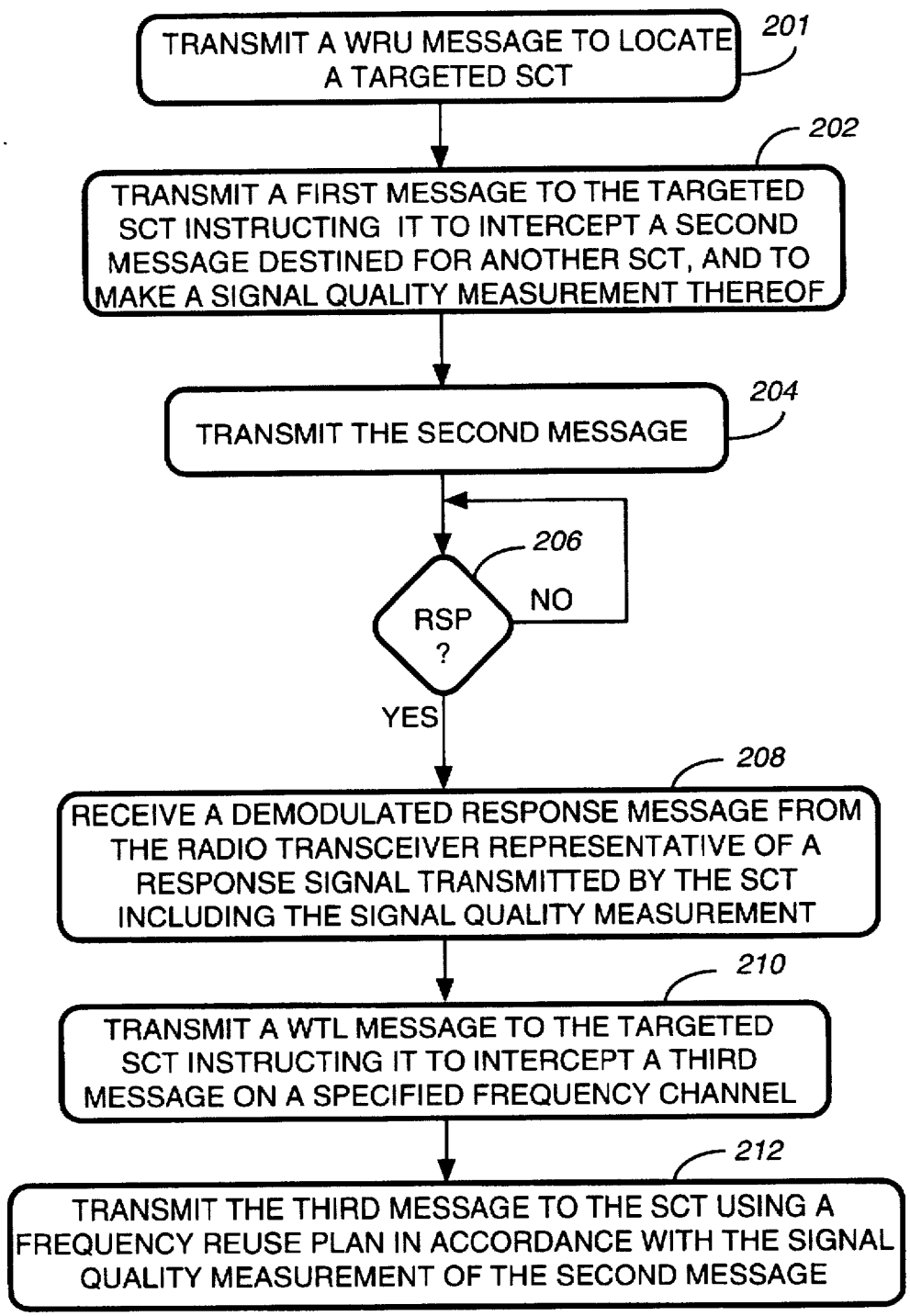
FIG. 2 is a flow chart depicting how the controller of FIG. 1 is programmed to operate according to the present invention.

FIG. 2 is a flow chart 200 depicting how the controller 108 of FIG. 1 is programmed to operate according to the present invention. The flow chart 200 begins with step 201 where the controller 108 causes the radio transceivers 114 to send a simulcast "Where aRe yoU" (WRU) message to a targeted SCT such as, for example, SCT 116. The WRU message is intended to prompt SCT 116 to identify its location within the messaging system. This is done, for example, by SCT 116 receiving a unique transmitter signature from one of the radio transceivers 114 transmitting the simulcast WRU message. Each radio transceiver 114 inserts its signature into the WRU message prior to transmission. By receiving a unique signature from one of the radio transceivers 114, SCT 116 identifies its location relative to one of the radio transceivers 114 that transmitted the WRU message. SCT 116 then transmits this signature back to the messaging system to notify the messaging system of its location.

Once the location of SCT 116 is known by the messaging system, in step 202, the controller 108 causes the radio transceiver 114 to transmit a first message to SCT 116. The first message preferably is also a simulcast message and represents a "Where To Monitor" (WTM) message. The first message instructs SCT 116 to listen to a second message destined for another SCT such as, for example, SCT 117. The second message is preferably a selective call message with, for example, a caller's message intended for the user of SCT 117. Hence, the second message is not a test message. By selecting a selective call message rather than creating a test message, the messaging system minimizes additional overhead for making remote test measurements. It will be appreciated that, alternatively, the second message can be a test message.

The second message is preferably transmitted according to a frequency reuse plan rather than as a simulcast transmission plan. The messaging system selects the second message, because the frequency reuse plan chosen for the second message is expected to be similar to the frequency reuse plan selected for SCT 116. The second message is also selected, because the transmitter used for transmitting the second message is the same transmitter expected to be used for SCT 116.

Since the second message may be private, the first message further instructs SCT 116 not to display the second message to a user of SCT 116. The first message also instructs SCT 116 to measure a signal quality level of the second message, and to transmit a response signal representative of the measured signal quality. The signal quality level of the second message is preferably a data error rate measurement. The data error rate measurement being, for example, a conventional bit or symbol error rate measurement.

The signal quality level of the second message can, alternatively, be a signal to interference measurement. The signal to interference measurement is preferably co-channel interference, and adjacent channel interference, co-channel interference representative of interference from communication cells utilizing the same communication frequency, and adjacent channel interference representative of harmonic noise coupled between adjacent frequency channels. It will be appreciated that other conventional signal to interference measurements can be made by SCT 116. It will be further appreciated that, alternatively, SCT 116 can transmit both the data error rate measurement and the signal to interference measurement as part of the response signal.

Once the first message has been transmitted, in step 204, the controller 108 causes the radio transceivers 114 to transmit the second message to SCT 117 according to the frequency reuse plan selected for that message. Upon intercepting the second message, SCT 116 measures the signal quality level of the message and transmits a response signal representative of the measurement. In step 206 the controller 108 awaits the response signal. Following the arrival of the response signal, the controller 108 proceeds to step 208 where it receives a demodulated response message from a radio transceiver 114 representative of the response signal transmitted by SCT 116.

The controller 108 proceeds to step 210 where it causes the radio transceivers 114 to transmit a simulcast "Where To Listen" (WTL) message to SCT 116 instructing it to intercept a third message on a specified frequency channel. The third message is a selective call message corresponding to a caller's message received from the PSTN 104 intended for the user of SCT 116. In step 212 the controller 108 causes the radio transceivers 114 to transmit the third message to SCT 116 using a frequency reuse plan in accordance with the signal quality level measured by SCT 116.

The method for transmitting the third message and the frequency reuse plan used is determined from four embodiments selected by the controller 108 singly or in combination. In a first embodiment, the controller 108 places the third message in a transmission queue along with other messages for other SCTs such as, for example, SCTs 116, 118–119 having similar signal quality levels, and transmits the third message along with other messages from the transmission queue. The queued messages can be transmitted simultaneously from the messaging system, or instead can be transmitted in batches depending on message traffic conditions.

In a second embodiment, the controller 108 designates a plurality of fixed frequency reuse plans, and selects one of the plurality of fixed frequency reuse plans to be used by the radio transceivers 114 according to the signal quality level. The selected frequency reuse plan is intended to substantially reduce co-channel and adjacent channel interferences.

In a third embodiment, the controller 108 selects a transmission power plan that adjusts the transmission power of a radio transceiver 114 that transmits the third message to improve the reliability of message reception according to the signal quality level. In this embodiment, the controller 108 can, for example, increase the transmission power of the radio transceiver 114 transmitting the third message. Alternatively, the controller 108 can reduce the transmission power of other radio transceivers 114 to reduce interference. It will be appreciated that any effective transmission power plan that improves the reliability of transmission to SCT 116 and overall system efficiency can be used.

In a fourth embodiment, the controller 108 adjusts the transmission data rate (i.e., baud rate) of the third message transmitted by a radio transceiver 114 in response to the signal quality level. In this embodiment, the controller 108 either decreases or increases the transmission baud rate of the third message according to the interference level measured by SCT 116. For high interference, the controller 108 selects a low baud rate, e.g., 1600 symbols per second (sps), while for low interference, the controller 108 selects a high baud rate, e.g., 3200 sps.

In situations where the signal quality level measured by SCT 116 is of a high quality, i.e., minimal noise interference, the controller 108 can select to transmit the third message using an aggressive frequency reuse plan and/or transmission power plan. For example, the controller 108 can select to use a frequency reuse plan that is more aggressive than the frequency reuse plan used for transmitting the second message, while maintaining the same transmission power plan used previously. It will be appreciated that any suitable combination of adjustments to the frequency reuse plan and the transmission power plan can be used by the controller 108 for reliably transmitting the third message to SCT 116 in accordance with the signal quality level measured.

It will be appreciated that, alternatively, step 210, which transmits the WTL message, can be eliminated, and incorporated instead in step 202. In this embodiment, the first message, which includes the WTM message, also includes the WTL message. This method reduces message overhead and message latency. However, informing SCT 116 that the third message is to be transmitted on a predetermined frequency channel limits the controller 108 on the type of adjustments it can make to improve the transmission quality of the third message. That is, in situations where, for example, the interference is primarily adjacent channel interference, the controller 108 must resort to other adjustments which do not include dynamically allocating a new channel. Although this embodiment may at times be less effective than the embodiment described in FIG. 2, it is still more efficient than prior art systems that solely rely on retransmission of messages to overcome interference.

The above method for transmitting the third message is applicable also to a simulcast two-way messaging system. In a two-way simulcast system, the flow chart steps described for FIG. 2 are substantially the same, with the exception that the second and third messages are substituted with second and third simulcast messages. The third simulcast message is transmitted to SCT 116 using a simulcast plan in accordance with a signal quality measurement made by SCT 116 of the second simulcast message.

The simulcast plan is determined from two embodiments selected by the controller 108 singly or in combination. In one embodiment the controller 108 adjusts the transmission baud rate of the radio transceivers 114 for transmitting the third simulcast message, while in the second embodiment the controller 108 adjusts the transmission power plan of the radio transceivers 114. Both adjustments are intended to improve the signal quality of the third simulcast message transmitted to SCT 116.

Figure 3:
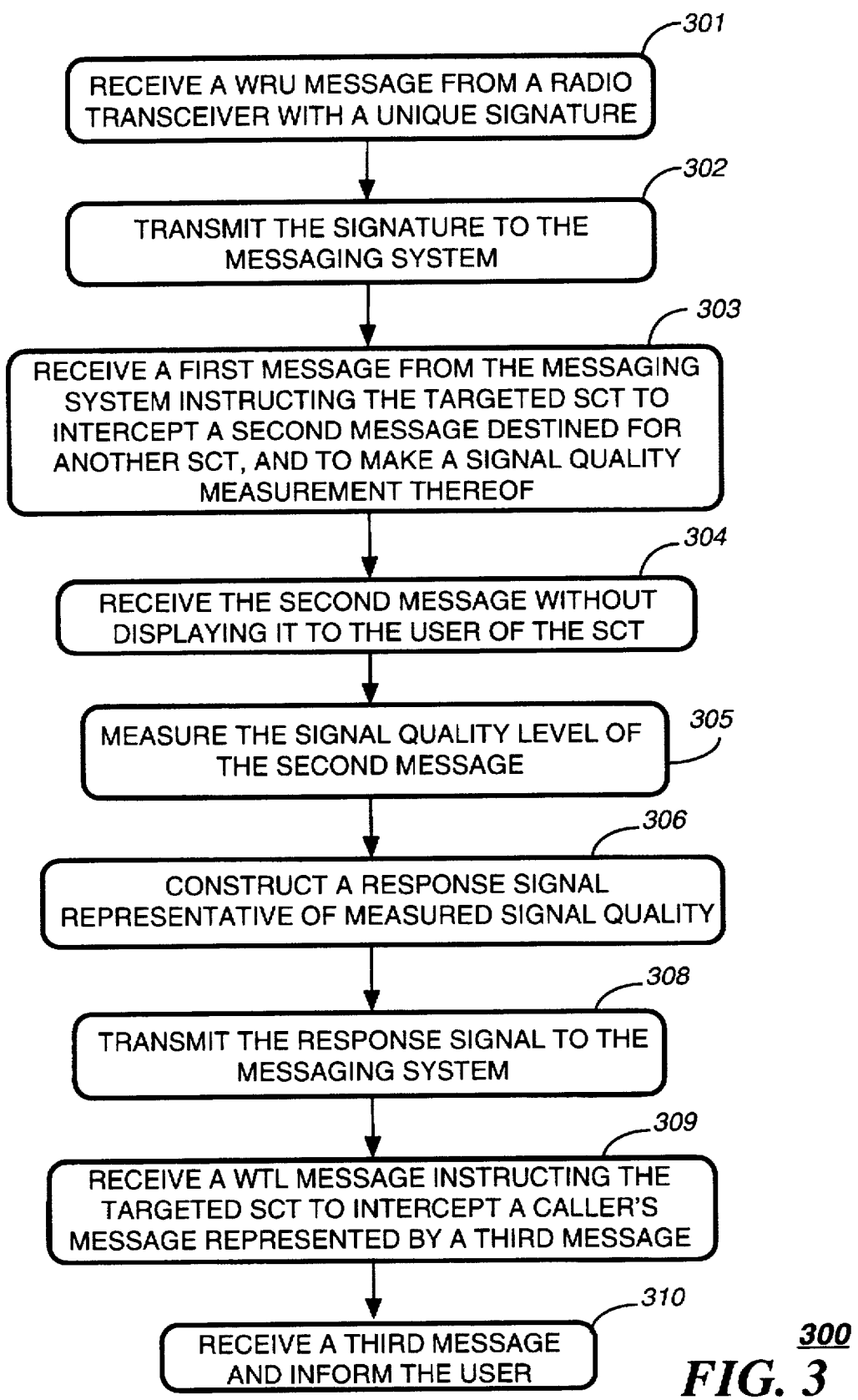
FIG. 3 is a flow chart depicting how a selective call transceiver of FIG. 1 is programmed to operate according to the present invention.

FIG. 3 is a flow chart 300 depicting how an SCT, such as SCT 116 of FIG. 1, is programmed to operate according to the present invention. FIG. 3 illustrates how SCT 116 informs the messaging system of a message signal quality level. The flow chart 300 begins with step 301 where the SCT 116 receives a WRU message from a radio transceiver 114 who transmitted a unique transmitter signature. In step 302, the SCT 116 transmits the signature to the messaging system. After the messaging system receives the transmitter signature, the SCT 116 receives, in step 303, a first message from the messaging system. The first message is representative of the WTM message discussed for FIG. 2. The first message instructs SCT 116 to listen to a second message destined for another SCT, such as SCT 117, to measure the signal quality level of the message, and to transmit a response signal representative of measured signal quality.

In step 304, the SCT 116 receives the second message and demodulates it into a demodulated message. Since the message transmitted to SCT 117 may be private, the first message further instructed SCT 116 not to display the message to a user of SCT 116. Moreover, when the signal quality measurement is completed the message is preferably discarded from the targeted SCT's 116 memory. Thereafter, in step 305, SCT 116 measures the signal quality of the demodulated message. The signal quality level of the message is determined from a data error rate measurement, and/or a signal to interference measurement as described above.

SCT 116 then proceeds to step 306 to construct the response signal representative of the measured signal quality. In step 308 SCT 116 transmits the response signal to the messaging system, providing the messaging system a means for improving the signal quality of messages transmitted to SCT 116. In step 309, the SCT 116 receives a WTL message from the messaging system instructing it to listen to a selected frequency channel for receiving a third message.

The third message is a selective call message corresponding to a caller's message intended for the user of SCT 116. SCT 116 then receives, in step 310, the third message from the messaging system transmitted according to the measured signal quality. The signal quality of the selective call message conforms to the embodiments described for FIG. 2.

It will be appreciated that, alternatively, SCT 116 autonomously intercepts messages destines for other SCTs. In doing so, SCT 116 measures the signal quality of each message intercepted, and transmits response signals to the messaging system representative of the measured signal quality levels of each respective message that was intercepted. The messaging system uses this information to determine levels of interference at different sites within the messaging system. The messaging system can then use this data to improve on the signal quality of messages transmitted to SCTs 116–120.

In summary, the present invention provides a novel method and apparatus for determining the level of interference experienced by a targeted SCT such as SCT 116 prior to transmitting a selective call message. In a messaging system where communication interferences are frequent, this method helps to substantially reduce, and in some instances eliminate, retransmission requests made by SCTs 116–120 that cannot receive messages due to severe interference. Although the method requires added message overhead, the overall bandwidth utilization of the messaging system is more efficient than the bandwidth utilization of prior art systems that rely strictly on retransmissions to resolve communication interference. The discussions that follow below describe an embodiment of the hardware used by the messaging system and SCTs 116–120, respectively, for implementing the invention.

Figure 4:
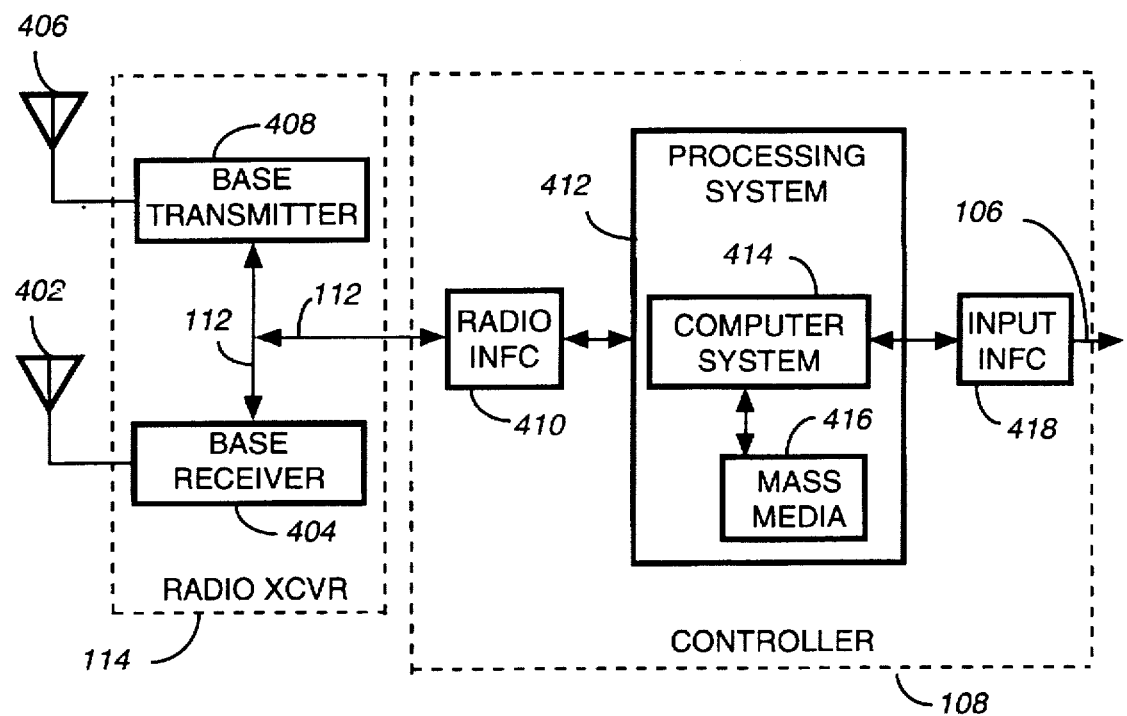
FIG. 4 is an electrical block diagram of a controller and a single radio transceiver for illustration purposes.

FIG. 4 is an electrical block diagram of the controller 108 and a single radio transceiver 114 for illustration purposes. It will be appreciated that, normally, the controller 108 is coupled to a plurality of radio transceivers 114 as shown in FIG. 1. The controller 108 includes a processing system 412, an input interface 418, and a radio interface 410. The hardware elements of the controller 108 are preferably a combination of the Wireless Messaging Gateway (WMG™) Administrator! paging terminal, and the RF-Conductor!™ message distributor manufactured by Motorola, Inc. It will be appreciated that other similar hardware can be used for the controller 108.

The processing system 412 is used for directing operation of the controller 108. To accomplish this task, the processing system 412 includes a conventional computer system 414 and a conventional mass storage media 416. The computer system 414 is programmed by software stored in the mass storage media 416. The software is programmed in accordance with the flow chart 200 of FIG. 2. The input interface 418 is coupled to the processing system 412 by way of the telephone link 106 for receiving messages from the PSTN 104. The radio interface 410 is coupled to the processing system 412 for sending and receiving messages thereto and therefrom the radio transceivers 114.

The radio transceiver 114 is coupled to the processing system 412 for transmitting messages to SCTs 116–120 and for receiving responses from SCTs 116–120. The radio transceiver 114 comprises at least one base transmitter 408 and at least one base receiver 404 coupled to transmitter and receiver antennas 406, 402, respectively. The hardware of the radio transceivers 114 is preferably a combination of the Nucleus® Orchestra! transmitter and RF-Audience!™ receivers manufactured by Motorola, Inc. It will be appreciated that other similar hardware can be used for the radio transceivers 114.

The base transmitter 408 transmits messages to SCTs 116–120 using conventional FM transmission means such as, for example, frequency shift keyed FM. The base receiver 404 receives messages from SCTs 116–120 using conventional means for receiving FM signals. Messages received from SCTs 116–120 are communicated to the radio interface 410, which in turn relays the messages to the processing system 412. The base transmitter 408 and the base receiver 404 are preferably not co-located in order reduce noise interference between them.

Figure 5:
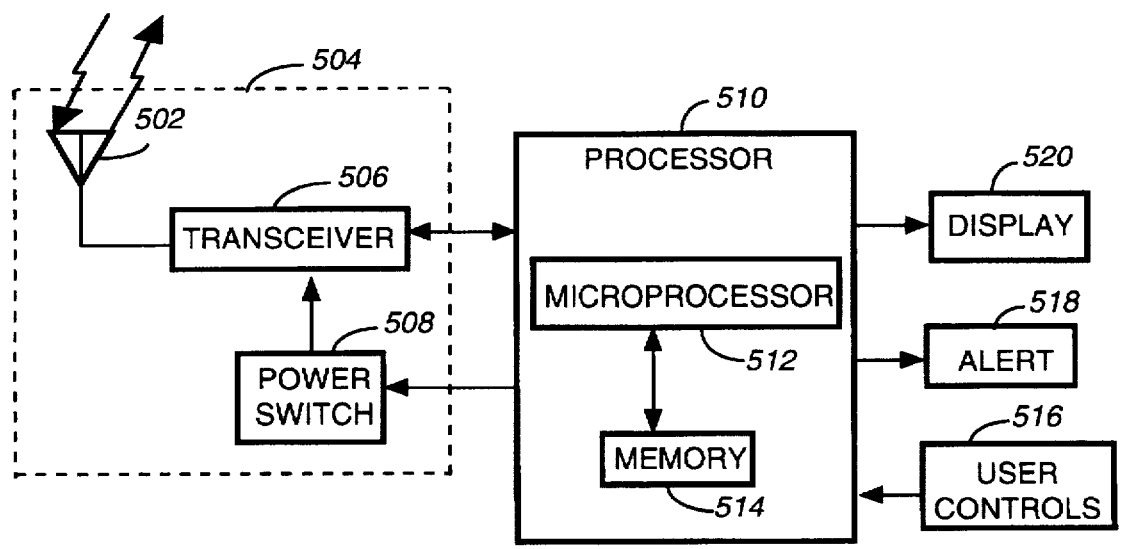
FIG. 5 is an electrical block diagram of the selective call transceiver.

FIG. 5 is an electrical block diagram of an SCT such as SCT 116 discussed above. SCT 116 comprises circuitry 504 for communicating with the messaging system, a processor 510 for controlling operation of SCT 116, user controls 516, an alerting device 518, and a display 520.

The circuitry 504 is used for receiving messages from the messaging system, and for transmitting response messages to the messaging system under the control of the processor 510. To send and receive messages, the circuitry 504 includes a transceiver antenna 502, a transceiver 506, and a power switch 508. The transceiver antenna 502 is coupled to the transceiver 506 for transmitting and receiving FM messages to and from the messaging system. Upon receiving an FM message from the messaging system, the transceiver 506 demodulates the FM message in a conventional manner, thereby providing the processor 510 a demodulated message. Similarly, when a response message is to be transmitted, the processor 510 causes the transceiver 506 to modulate the response message into a response signal that is transmitted on the transceiver antenna 502. The power switch 508 is a conventional MOS switch that is coupled to the processor 510 for controlling power supplied to the transceiver 506, thereby providing a battery saving function.

To perform the necessary functions of SCT 116, the processor 510 includes a microprocessor 512, and a memory 514. The microprocessor 512 is, for example, a M68HC08 micro-controller manufactured by Motorola, Inc. The memory 514 preferably includes a conventional read-only memory (ROM) and a conventional random-access memory (RAM).

The microprocessor 512 is programmed by way of the memory 514 in accordance with the flow chart 300 FIG. 3, as well as for processing selective call messages intended to be displayed to the user of SCT 116. Upon receiving a selective call message, for example, the microprocessor 512 samples the demodulated message generated by the transceiver 506. The microprocessor 512 then decodes an address in the demodulated message, compares the decoded address with one or more addresses stored in the memory 514, and when a match is detected, proceeds to process the remaining portion of the message.

Once the microprocessor 512 has processed the message, it stores the message in the memory 514, and a call alerting signal is generated to alert a user that a message has been received. The call alerting signal is directed to a conventional audible or tactile alerting device 518 for generating an audible or tactile call alerting signal. By the use of appropriate functions provided by the user controls 516, the received message is recovered from the memory 514, and displayed on a display 520. The display 520 is, for example, a conventional liquid crystal display (LCD). Alternatively, when the message is a voice message, the message is played out on a conventional audio circuit (not shown in FIG. 5) that is included in SCT 116.

The present invention provides a novel method and apparatus for determining the level of noise interference experienced by SCTs 116–120 prior to transmitting messages thereto. In particular, the messaging system determines the level of noise interference at the location of a targeted SCT such as SCT 116, and uses this information accordingly to transmit a message to SCT 116 at a quality level that is sufficient for it to reliably receive the message. This method provides a more efficient use of system bandwidth than prior art systems, which rely solely on retransmission requests to resolve communication interference.

What is claimed is:

1. In a radio communication system that uses frequency reuse, a method for optimizing transmission of messages to a selective call transceiver, comprising:

sending a first message to the selective call transceiver, wherein the first message instructs the selective call transceiver to receive a second message destined for another selective call transceiver, to measure a signal quality level of the second message, and to transmit to the radio communication system a response signal representative of the measured signal quality level of the second message;

sending the second message to the other selective call transceiver;

receiving the response signal from the selective call transceiver; and transmitting a third message to the selective call transceiver, utilizing a frequency reuse plan in accordance with the signal quality level of the second message.

2. The method as set forth in claim 1, wherein the first message further instructs the selective call transceiver not to display the second message to a user of the selective call transceiver.

3. The method as set forth in claim 1, wherein the signal quality level of the second message is a data error rate measurement.

4. The method as set forth in claim 1, wherein the signal quality level of the second message is a signal to interference measurement.

5. The method as set forth in claim 1, wherein the transmitting step comprises the steps of:

placing the third message in a transmission queue along with other messages for other selective call transceivers having similar signal quality levels; and transmitting the third message along with other messages from the transmission queue.

6. The method as set forth in claim 1, wherein the transmitting step comprises the steps of:

designating a plurality of fixed frequency reuse plans; and selecting one of the plurality of fixed frequency reuse plans, in response to the signal quality level.

7. The method as set forth in claim 1, wherein the transmitting step the radio communication system adjusts transmission power of the third message transmitted to the selective call transceiver in response to the signal quality level.

8. The method as set forth in claim 1, wherein the transmitting step the radio communication system adjusts a transmission data rate of the third message transmitted to the selective call transceiver in response to the signal quality level.

9. In a radio communication system that transmits simulcast messages, a method for optimizing transmission of messages to a selective call transceiver, comprising:

sending a first message to the selective call transceiver, wherein the first message instructs the selective call transceiver to receive a second simulcast message destined for another selective call transceiver, to measure a signal quality level of the second simulcast message, and to transmit to the radio communication system a response signal representative of the measured signal quality level of the second simulcast message;

sending the second simulcast message to the other selective call transceiver;

receiving the response signal from the selective call transceiver; and transmitting a third simulcast message to the selective call transceiver, utilizing a simulcast plan in accordance with the signal quality level of the second simulcast message.

10. The method as set forth in claim 9, wherein the simulcast plan includes adjusting a transmission data rate of the radio communication system so as to improve signal quality of the third simulcast message transmitted to the selective call transceiver.

11. The method as set forth in claim 9, wherein the simulcast plan includes adjusting transmission power of the radio communication system so as to improve signal quality of the third simulcast message transmitted to the selective call transceiver.

12. In a selective call transceiver that receives messages from a radio communication system, a method for informing the radio communication system of a message signal quality level, comprising:

receiving a first message transmitted by the radio communication system instructing the selective call transceiver to receive a second message destined for another selective call transceiver, to measure a signal quality level of the second message, and to transmit to the radio communication system a response signal representative of the measured signal quality level of the second message;

receiving the second message destined for the other selective call transceiver;

measuring the signal quality level of the second message;

constructing a response signal representative of the measured signal quality level of the second message;

transmitting the response signal to the radio communication system; and receiving a third message transmitted by the radio communication system utilizing a frequency reuse plan in accordance with the measured signal quality level of the second message.

13. The method as set forth in claim 12, wherein the selective call transceiver receives a first message from the radio communication system, and wherein the first message instructs the selective call transceiver to listen to the message destined for the other selective call transceiver, to measure the signal quality level of the message, and to transmit the response signal representative of measured signal quality.

14. The method as set forth in claim 12, wherein the selective call transceiver does not display the message to a user of the selective call transceiver.

15. The method as set forth in claim 12, wherein the signal quality level of the message is determined from a data error rate measurement.

16. The method as set forth in claim 12, wherein the signal quality level of the message is determined from a signal to interference measurement.

17. In a radio communication system that uses frequency reuse, a method for optimizing transmission of messages to a selective call transceiver, comprising:

sending a first message to the selective call transceiver, wherein the first message instructs the selective call transceiver to receive a second message destined for another selective call transceiver, to measure a signal quality level of the second message based on a data error rate measurement, to transmit to the radio communication system a response signal representative of the measured signal quality level of the second message, and not to display the second message to a user of the selective call transceiver;

sending the second message to the other selective call transceiver;

receiving the response signal from the selective call transceiver; and transmitting a third message to the selective call transceiver, utilizing a frequency reuse plan in accordance with the signal quality level of the second message.

18. In a selective call transceiver that receives messages from a radio communication system, a method for informing the radio communication system of a message signal quality level, comprising:

receiving a first message transmitted by the radio communication system instructing the selective call transceiver to receive a second message destined for another selective call transceiver, to measure a signal quality level of the second message and to transmit to the radio communication system a response signal representative of the measured signal quality level of the second message;

receiving a second message destined for another selective call transceiver, wherein the selective call transceiver is programmed not to display the second message to a user of the selective call transceiver;

measuring a signal quality level of the second message, wherein the signal quality level of the second message is a data error rate measurement;

constructing a response signal representative of measured signal quality level of the second message;

transmitting the response signal to the radio communication system; and receiving a third message transmitted by the radio communication system utilizing a frequency reuse plan in accordance with the measured signal quality level of the second message.

19. A controller in a radio communication system that uses frequency reuse for optimizing transmission of messages to a selective call transceiver, comprising:

a processing system for directing operation of the controller;

a radio transceiver coupled to the processing system for transmitting messages to a selective call transceiver and for receiving responses from the selective call transceiver, wherein the processing system is programmed to:

cause the radio transceiver to transmit a first message to the selective call transceiver, wherein the first message instructs the selective call transceiver to receive a second message destined for another selective call transceiver, to measure a signal quality level of the second message, and to transmit to the radio communication system a response signal representative of the measured signal quality level of the second message;

cause the radio transceiver to transmit the second message to the other selective call transceiver;

receive a demodulated response message from the radio transceiver representative of the response signal transmitted by the selective call transceiver; and cause the radio transceiver to transmit a third message to the selective call transceiver, wherein the radio transceiver utilizes a frequency reuse plan in accordance with the signal quality level of the second message.

20. The controller as set forth in claim 19, wherein the first message further instructs the selective call transceiver not to display the second message to a user of the selective call transceiver.

21. The controller as set forth in claim 19, wherein the signal quality level of the second message is determined from a data error rate measurement.

22. The controller as set forth in claim 19, wherein the signal quality level of the second message is determined from a signal to interference measurement.

23. A selective call transceiver that informs a radio communication system of a message signal quality level, comprising:

a processor for controlling operation of the selective call transceiver;

circuitry coupled to the processor for receiving messages from the radio communication system, and for transmitting response messages to the radio communication system, wherein the processor is programmed to:

receive a first message transmitted by the radio communication system instructing the selective call transceiver to receive a second message destined for another selective call transceiver, to measure a signal quality level of the second message, and to transmit to the radio communication system a response signal representative of the measured signal quality level of the second message;

receive a demodulated message from the circuitry representative of the second message transmitted by the radio communication system destined for another selective call transceiver;

measure a signal quality level of the demodulated message;

construct a response signal representative of measured signal quality level of the second message;

cause the circuitry to transmit the response signal to the radio communication system; and receive a third message transmitted by the radio communication system utilizing a frequency reuse plan in accordance with the measured signal quality level of the second message.

24. The selective call transceiver as set forth in claim 23, the selective call transceiver further comprising a display for displaying messages to a user, and wherein the selective call transceiver is programmed not to display the message to the user.

* * * * *